US009813861B2

(12) United States Patent
Fisher et al.

(10) Patent No.: US 9,813,861 B2
(45) Date of Patent: Nov. 7, 2017

(54) MEDIA DEVICE THAT USES GEOLOCATED HOTSPOTS TO DELIVER CONTENT DATA ON A HYPER-LOCAL BASIS

(71) Applicant: APPOET INC., Highland Park, IL (US)

(72) Inventors: Joshua Adler Fisher, Highland Park, IL (US); Jeremy Applebaum, Highland Park, IL (US)

(73) Assignee: APPOET INC., Highland Park, IL (US)

( * ) Notice: Subject to any disclaimer, the term of this patent is extended or adjusted under 35 U.S.C. 154(b) by 0 days.

(21) Appl. No.: 14/812,678

(22) Filed: Jul. 29, 2015

(65) Prior Publication Data
US 2016/0037299 A1    Feb. 4, 2016

Related U.S. Application Data

(60) Provisional application No. 62/030,997, filed on Jul. 30, 2014.

(51) Int. Cl.
*H04W 24/00* (2009.01)
*H04W 4/02* (2009.01)
*H04W 64/00* (2009.01)

(52) U.S. Cl.
CPC ........ *H04W 4/022* (2013.01); *H04W 64/003* (2013.01)

(58) Field of Classification Search
CPC .................... H04W 64/003; H04W 4/022
USPC ....... 455/411, 456.2; 370/315, 338; 709/223
See application file for complete search history.

(56) References Cited

U.S. PATENT DOCUMENTS

| | | | |
|---|---|---|---|
| 7,978,665 B1 * | 7/2011 | Jaynes ................ G06F 17/3087 370/338 |
| 8,180,317 B2 | 5/2012 | Fujimoto | |
| 8,805,611 B2 | 8/2014 | Damon et al. | |
| 9,094,946 B2 | 7/2015 | Aguirre et al. | |
| 2004/0152447 A1 * | 8/2004 | McDonnell ......... H04L 12/2856 455/411 |
| 2005/0143094 A1 * | 6/2005 | Reed ....................... H04W 4/00 455/456.2 |
| 2007/0297355 A1 * | 12/2007 | Jendbro .................. H04L 41/12 370/315 |
| 2012/0303774 A1 * | 11/2012 | Wilson .................... H04L 67/26 709/223 |
| 2014/0162692 A1 * | 6/2014 | Li .......................... H04L 67/40 455/456.3 |

* cited by examiner

*Primary Examiner* — Charles Shedrick
(74) *Attorney, Agent, or Firm* — Winston & Strawn LLP

(57) ABSTRACT

The hyper-local broadcasting system may include a global positioning system ("GPS") embedded in a user's media device, such as a smartphone or tablet. The hyper-local broadcasting system allows a person to create a localized hotspot and to specify the information that is pushed to users who enter the hotspot in a hyper-localized manner. Such information may be, for example, ads, coupons, music, video, literature, and other information that may be particularly relevant to the hotspot.

41 Claims, 5 Drawing Sheets

Use of the Infused Mobile App

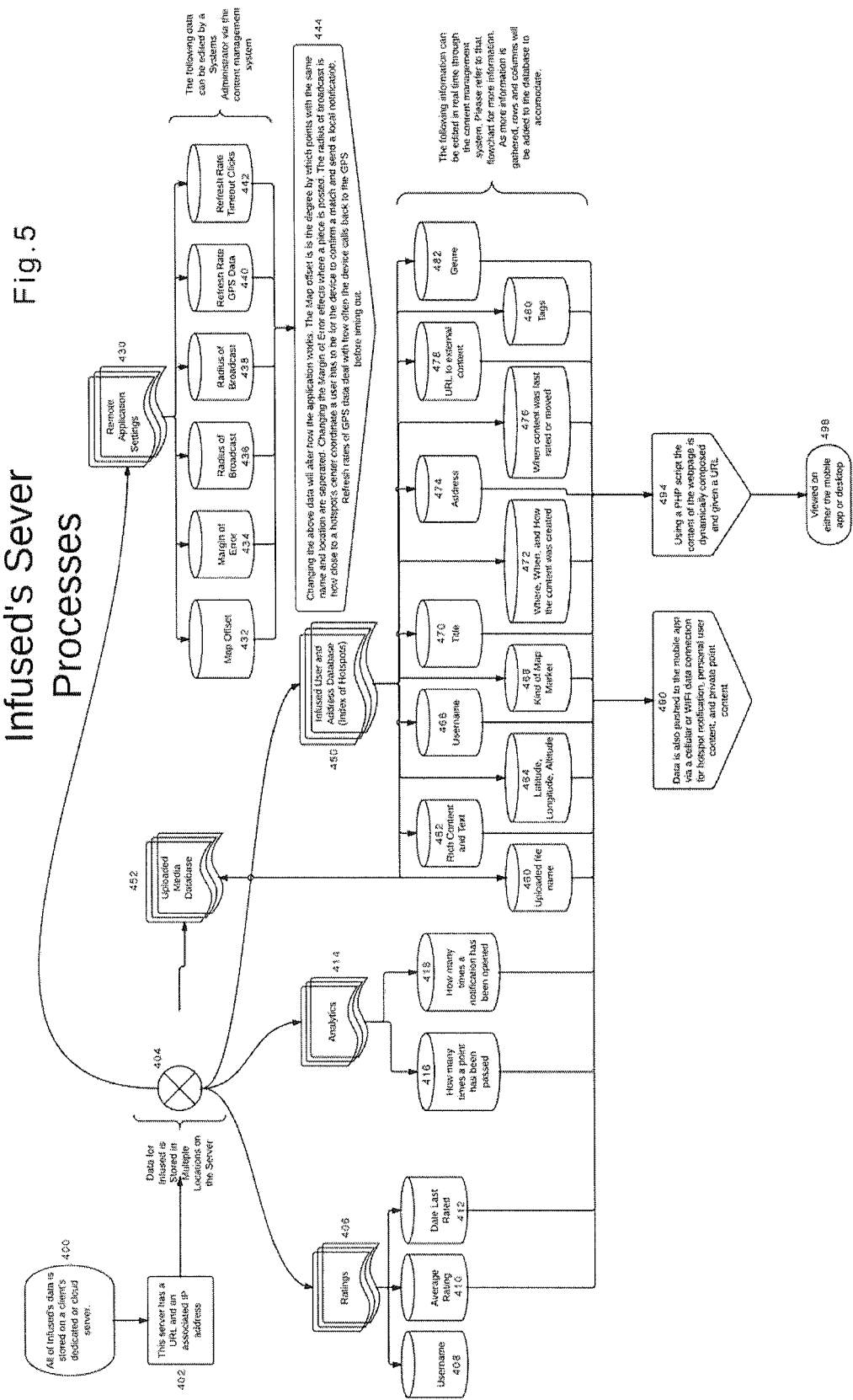

MEDIA DEVICE THAT USES GEOLOCATED HOTSPOTS TO DELIVER CONTENT DATA ON A HYPER-LOCAL BASIS

CROSS-REFERENCE TO RELATED APPLICATIONS

This application claims the benefit of U.S. provisional application No. 62/030,997 filed on Jul. 30, 2014, the entire content of which is incorporated herein by reference thereto.

FIELD OF THE INVENTION

The field of the invention relates to a global-positioning system for delivering information to users based on the location of the user, and particularly to a global-positioning system that pushes information on a hyper-local basis to a user's media device, such as a cell phone or tablet.

DESCRIPTION OF THE RELATED ART

Marketing and advertising play a large role in growing the public's awareness of and desire for products and services. Broadcast marketing and print advertising have been performed on a macro scale, meaning that the same ad is broadcast, sent, or displayed to many people. For example, television and radio ads are broadcast to everyone who receives the channel or station. Billboards display their ads to everyone who passes by. Magazine and newspaper ads are directed at subscribers of the magazines and newspapers, who may span various regions. However, such macro-scale advertising is a shotgun approach, where many of the recipients have no interest in the particular product being advertised, resulting in a low percentage of recipients who act on the advertisements and purchase the advertised products. Further, billboards and radio/TV advertisements cannot change easily in a real-time response to consumer spending, and they require substantial maintenance, upkeep and labor. In an effort to increase the effectiveness of ads, marketers and advertisers have tried to fine tune the relevance of their ads to people, by making a rifle shot of ads to consumers. For instance, with the advent of online shopping via online accounts and customer-loyalty programs at stores, vendors and their advertisers can track each person's shopping preferences and habits. Knowing each person's personal shopping preferences and interests allows advertisers to target the most relevant ads to each person.

However, while online vendors and stores may know what their member customers buy, the stores do not know the shopping preferences of non-members or people who are browsing the store. Moreover, at present, such personalized ads are typically sent by email to each person's email account used to register for the online accounts and customer-loyalty programs. Such emailed ads are typically sent without knowledge of the user's current location. The user's current location may affect the relevance of certain products and services. Another disadvantage of traditional systems is the substantial cost of necessary hardware, such as computer servers, needed to track customers' spending patterns and to email ads to consumers. In addition, the timeliness of ads is important because, for example, an effective time to send an ad on toothpaste is when the consumer is near a store that sells toothpaste, not when the consumer has already purchased toothpaste and is on his way home. Besides ads for products and services, other media content would benefit from being broadcast on a local basis, such as music, literature, photos and video.

Determining the location of a person can be achieved by global-positioning systems ("GPS"). Recently, in the advanced high-integration of multi-media and multi-function systems, such as smartphones and tablets, GPS has been provided on smartphones and tablets. GPS functions on a cell phone or tablet have enabled users to obtain directions to a store, find close-by restaurants, and the like. As a result, existing GPS devices continually transmit the device's location (i.e., through GPS parameters such as latitude, longitude, and altitude) to a server, even when the device is not moving, and the server continuously determines whether to transmit information to the device. Such continual transmission of GPS location signals and continuous checking by the server whether each user should receive content information are an inefficient use of resources and communication networks. Thus, there is a need for using a user's location to determine which ads, media, and other content information to send to the user without the user having to continually send GPS location signals to the server and without the server having to continually check the received GPS location signals.

BRIEF SUMMARY OF THE INVENTION

As an aspect of the novel system and method described herein, an example embodiment is a user's media device, such as a cell phone or tablet, that sends its GPS location to a server, receives a list of hotspots from the server, checks its own GPS location with the received list of hotspots, and if its own GPS location matches a hotspot on the received list, pushes a notification to the user asking if the user would like to see content information.

Other systems methods, features and advantages of the invention will be or will become apparent to one with skill in the art upon examination of the following figures and detailed description. It is intended that all such additional systems, methods, features, and advantages be included within this description, be within the scope of the invention.

BRIEF DESCRIPTION OF THE DRAWINGS

FIG. 5 is a detailed diagram of the processes running on the server 14 of FIG. 1.

Figure 1:
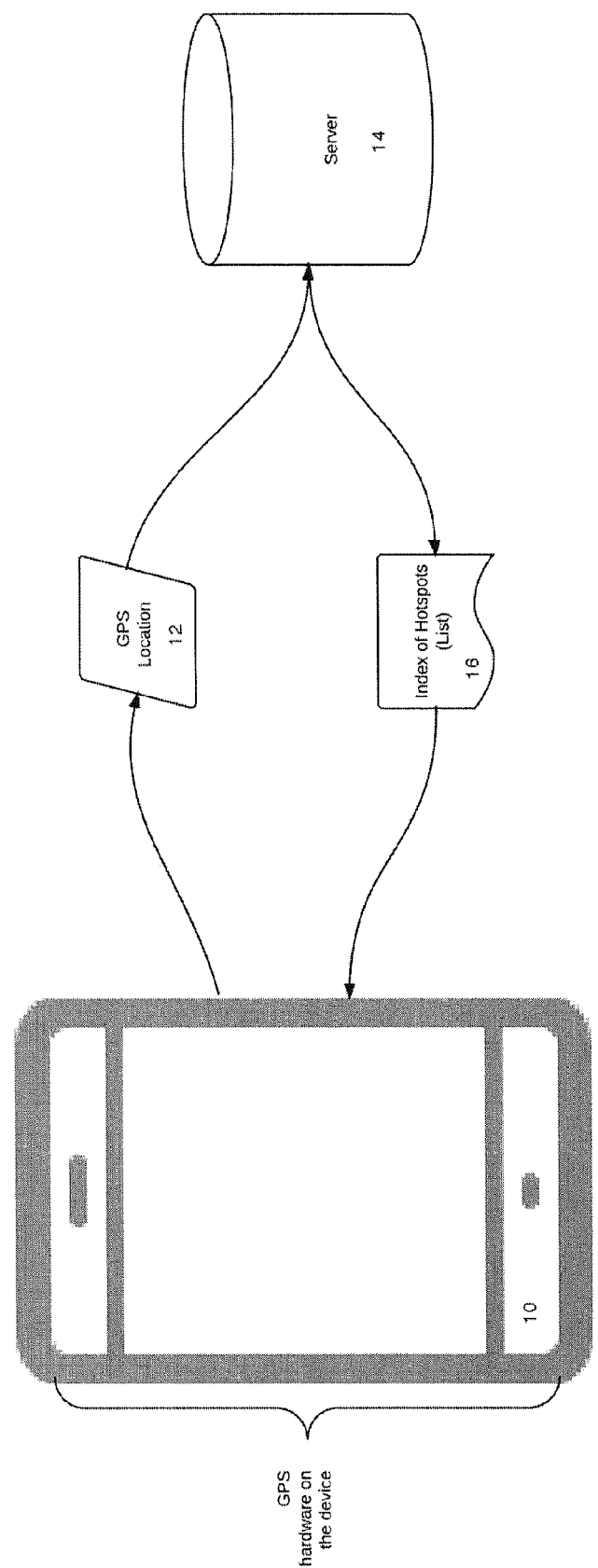
FIG. 1 is a high-level block diagram of an example embodiment showing steps in delivering content information to a user based on the user's location relative to nearby geolocated hotspots.

The components in the figures are not necessarily to scale, with emphasis instead being placed upon illustrating the principles of the invention. Moreover, in the figures, like reference numerals designate corresponding parts throughout the different views. However, like parts do not always have like reference numerals. Moreover, all illustrations are intended to convey concepts, where relative sizes, shapes, and other detailed attributes may be illustrated schematically rather than literally or precisely. Some figures refer to "infused" technology, which is the patent applicants' name of their technology.

DETAILED DESCRIPTION OF THE INVENTION

This describes example embodiments of a user GPS-enabled media device that delivers information content based on a hyperlocal basis of the user's location relative to hotspots in the proximity of the user. A mobile media computing device—such as a smartphone, tablet computer, or laptop computer—may include functionality for determining its location, direction, or orientation, such as a GPS receiver, compass, or gyroscope. Such a device may also include functionality for wireless communication, such as Bluetooth communication, near-field communication (NFC), or infrared (IR) communication, or communication with a wireless local-area networks (WLANs) or cellular-telephone network. Such a device may also include one or more cameras, scanners, touchscreens, microphones, or speakers. Mobile computing devices may also execute software applications, such as games, web browsers, or content-management applications. With content-management applications, users may publish, create, and share information with other users in their networks. The invention is not limited to the below-described embodiments, but the invention can cover appropriate changes to the embodiments.

FIG. 1 is a high-level block diagram of an example embodiment showing steps in delivering content information to a user based on the user's location relative to nearby geolocated hotspots. A geolocated hotspot is a physical location on Earth that has GPS parameters, such as latitude, longitude, and/or altitude. There are known ways to create a geolocated hotspot. A geolocated hotspot is used by the embodiment to determine on a hyper-local basis whether certain content information, such as a local ad or special music, should be broadcast to users within proximity of the hotspot.

As illustrated in FIG. 1, an example embodiment is a user's media device 10, such as a cell phone or tablet, that sends its GPS location 12 at regular intervals to a server 14. The server 14 receives the GPS location 12 and compares the received GPS location 12 with a database of previously created geolocated hotspots to determine whether the received GPS location 12 is within a certain predetermined proximity of the server's hotspots. The predetermined proximity may be determined in a variety of ways, any of which will work in the embodiment. For example, the proximity may be a certain absolute number that the latitude and longitude of the received GPS location 12 must be within the latitude and longitude of a hotspot. The process to create a geolocated hotspot will be described later. The server 14 then sends to the media device 10 a list of hotspots 16 that are located within a certain proximity of the GPS location 12 of the media device 10. In the example embodiment, the server 14 delivers a list or index of a hyper-local batch of geolocated hotspots, located within a predefined radius of the GPS location of the user's media device 10, to the media device 10. Preferably, the server 14 delivers the list or index of local hotspots at a predetermined refresh rate to a user's media device 10. The refresh rate may be programmable or modified as suitable.

The media device checks at intervals its own GPS location 12, even as the media device moves, with the received list of hotspots 16, and if its own GPS location 12 matches a hotspot on the received list 16, the media device 10 pushes a notification to the user asking if the user would like to see content information. These push notifications, once opened by the user, are linked to user curated and uploaded rich media content on the server 14, which then is delivered and displayed within a native application on the media device 10. There are various known methods to create push notifications as well as to upload media content to a native application on a media device. To clarify, these notifications are not sent from the server. Only after the application on the user's media device 10 checks the device's current location against the downloaded index of hotspots and finds a match does it then, and only then, send a local notification via the application, through the user's media device 10, to the user. This trigger is considered to be a significant advantage of the application. This embodiment works by mechanism of a special trigger whereby a large batch of geolocated hotspots 16 centrally located around the user, in a user-defined radius, refreshed at a user-chosen rate, filtered by the user, published by the user and fellow users is downloaded as an index 16 created through an engine script running on a dedicated server 14, to an application on the user's media device 10. The application activates the GPS system on the user's media device 10 and checks its location against the index of geolocated hotspots 16 for a match. When a match occurs, the application signals the user's media device to send a native push notification to the user. If the user desires to see the content information, the media device 10 sends a message to the server 14 requesting the content information, which is then shared with the user. When the user activates the notification, the application on the user's media device 10 takes the user to a dynamically created webpage composed by engine script from uploaded user content that displays what was infused at that hotspot. The content information may be a local ad, a coupon for a local store, a message, a video, a song, and any other content.

An example application is for a coupon vendor such as Groupon. When a user's media device checks its GPS coordinates and determines that it has entered the proximity of a hotspot created by Groupon, which hotspot appears on a list sent by Groupon's server to the media device, the media device will send a push notification to the user asking if the user would like to see a certain coupon from Groupon. As a result, Groupon can send coupons to users on a hyper-local basis, resulting in more targeted ads and higher success rates.

Another example application is for a real-estate agency. When people shop for a house (or apartment, office, or other real estate) to buy or rent, they often drive through the neighborhood. Some neighborhoods restrict the posting of for-sale and for-lease signs, so some available properties may not have signs. Sometimes the homeowner does not allow signs because signs may cause criminals to target the house if it is vacant. Even if signs exist in a neighborhood, signs do not convey enough information to the home buyer/renter. Homebuyers want to know the square footage, floor plan, whether the interior of the house has been renovated, etc. However, such information is often not printed on signs. With the improved hyper-local technology, a real-estate agency may create a hotspot for each neighborhood. When a person is driving around, the person's cell phone may send its GPS location to the server of the real-estate agency. The server determines that the person is within a predefined proximity of some of the hotspots for various neighborhoods and sends a list of those hotspots to the person's cell phone. Then when the person drives into a hotspot, the person's cell phone realizes that its GPS location matches that of the hotspot. As a result, the cell phone itself pushes a notification to the person, asking if the person would like to see houses for sale/lease in that neighborhood. If the person indicates yes, the cell phone interacts with the server of the real-estate agency and displays information about available properties in that neighborhood, such as data about the property, photos of the interior of the property, videos of the property, and contact information of the listing real-estate agent for that property. That content information, as in any other application, may be interactive so the user may select certain information to see, request additional information, send messages to the server, etc. When the person exits that hotspot and enters another neighborhood whose hotspot also appears on the list of hotspots, the cell phone again sends a push notification to the person, asking if the person would like to see available properties in that neighborhood.

Yet another example application is a golf course. The server of the golf course may set up a hotspot for each hole. When a player enters the proximity of a hole, the player's cell phone or tablet may send a push notification to the player, asking if the player would like to see tips about how to play the hole. For example, the tips may state the distance from the tee to the hole, the slope of the terrain, the wind, and a suggested iron or wood to use.

Many other applications exist and would benefit from this technology that pushes content to a media device on a hyper-local basis.

Figure 2:
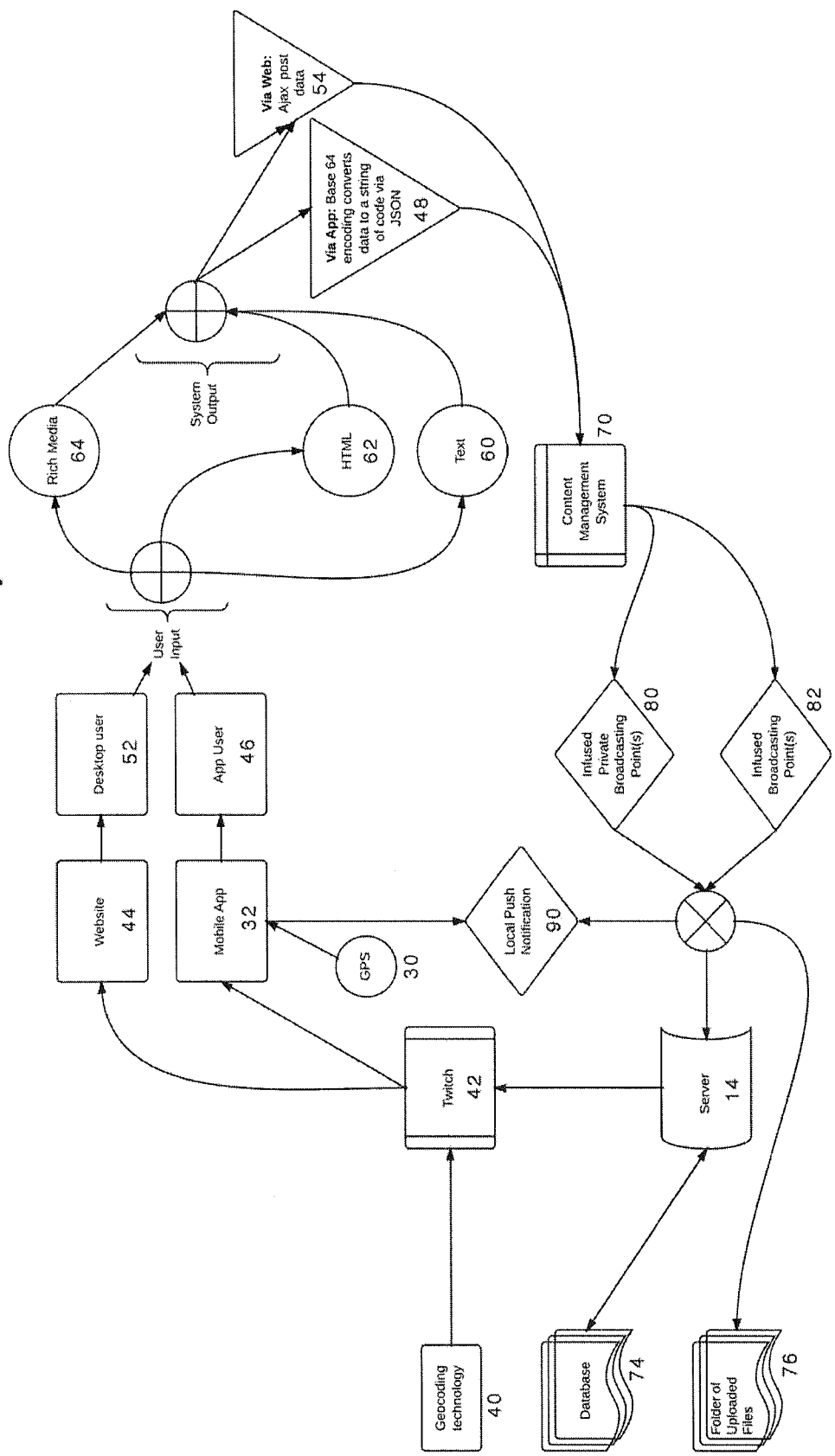
FIG. 2 is a high-level block diagram showing interactions between users, the users' GPS-enabled media device, and other components of a system that embodies the invention.

FIG. 2 is a high-level block diagram showing interactions between users, the users' GPS-enabled media device, and other components of a system that embodies the invention. The GPS system captures within a certain margin of error the user's location using latitude, longitude, and altitude parameters. GPS systems are well known and can be purchased off the shelf as components.

In FIG. 2, a GPS hardware and software system 30 resides on a user's mobile media device, such as a cell phone or tablet (not illustrated in FIG. 2). The GPS system 30 interacts with a mobile application 32 running on the user's media device. Engine script 42 (called "Twitch" in the figures) is a backend software program running on the server 14 that acts as a crossing guard that compiles and delivers the appropriate information to the correct recipient. In other words, engine script 42 is a program of written functions that direct information to where it needs to go. The engine script 42 can send information to the mobile application 32 on the user's media device as well as to a website 44. Engine script 42, for example, sends GPS location coordinates of the user's media device, such as latitude, longitude, and altitude, in a data packet to the server. A geocoder 40 resides on the server 14 and is a known technology for interacting with satellites for interpreting GPS information. The geodecoder 40 interprets the GPS information in the received data packet and saves the GPS location in a database on the server.

The server owner 46 is the server administrator at the company that owns the server 14 and who can create hotspots. The server owner 46 can input data via the mobile application 32 on the user's media device, where a base-64 encoder converts the data into a string of code via JavaScript Object Notation ("JSON"). JSON is a well-known open standard format that uses human-readable text to transmit data objects and is used primarily to transmit data between a server and web application. Alternatively, the user 52 (who owns the media device 10) may input the data via the website 44 accessed from a desktop computer, where an AJAX script 54 posts the inputted data to the server 14. AJAX is well known as an Asynchronous JavaScript and XML and is a group of interrelated web development techniques used to create asynchronous web applications. According to Wikipedia, with AJAX, web applications can send data to, and retrieve data from, a server asynchronously (in the background) without interfering with the display and behavior of the existing webpage.

Figure 4:
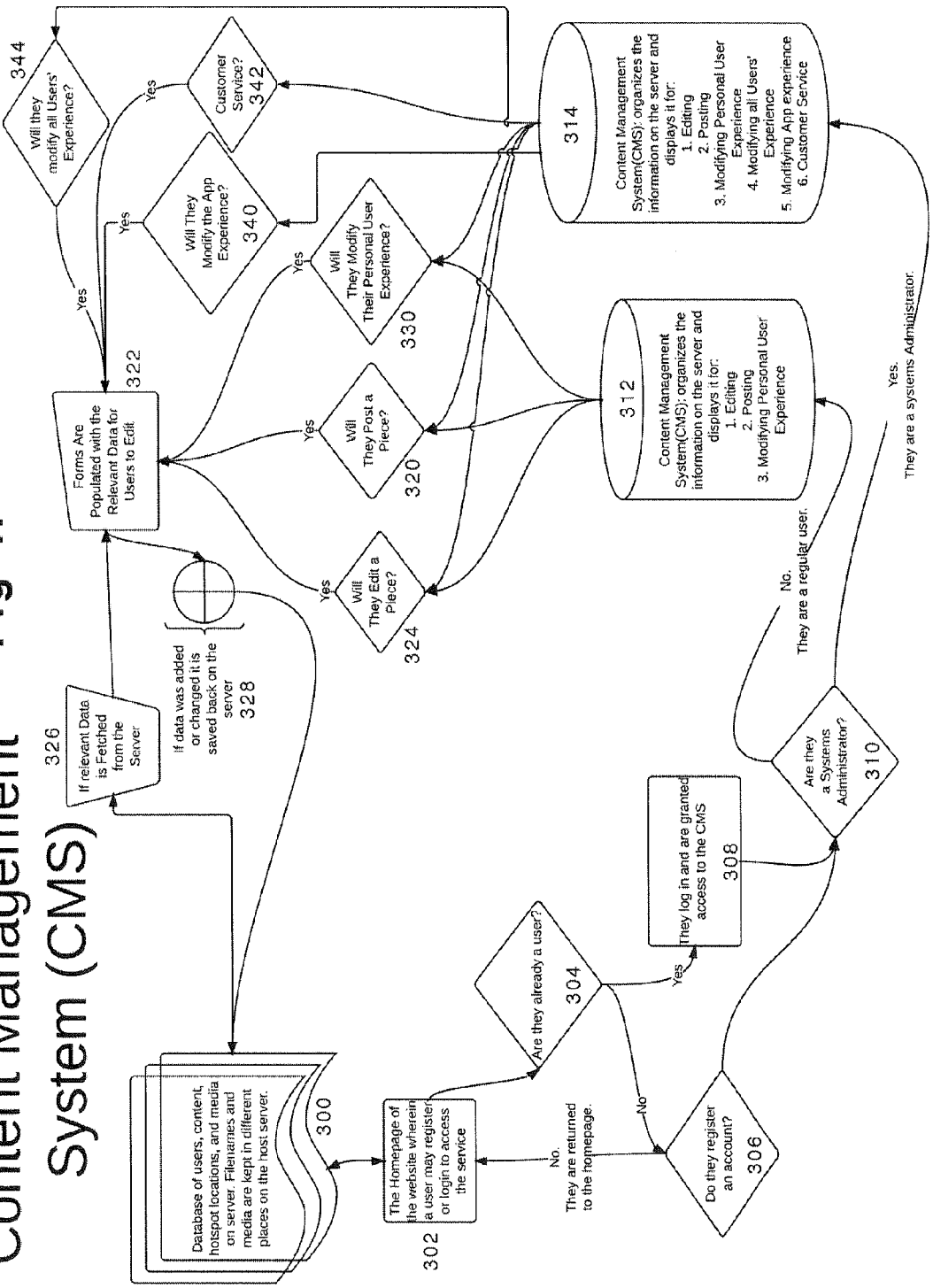
FIG. 4 is a detailed flowchart showing the operation and functionality of the Content Management System component 70 of FIG. 2.

The server owner of the server 14 may create a hotspot by following the steps described after the discussion of FIG. 4. After creating a hotspot, the server owner can input information that will be broadcast to the hotspot. Such information may be uploaded to the server 14 by the server owner in the form of text 60, HTML programming 62, or rich media 64, such as photos, drawings, videos, music, etc. A content-management system 70 receives the content information and stores it in a database 74 on a server 14 and/or in a folder of uploaded files 76 that resides on the server 14. The content-management system 70 processes the content information and designates the information as being for a private-broadcasting hotspot 80 or a public-broadcasting hotspot 82. When the information is designated as being for a public-broadcasting hotspot 82, then any user GPS-enabled media device that enters the hotspot will receive a broadcast of the information. When the information is designated as being for a private-broadcasting hotspot 80, then only those GPS-enabled media devices that enter the hotspot and whose identity appears on a list of allowed members will receive a broadcast of the information.

When a user's GPS-enabled media device 10 detects that it has entered either a public hotspot or a private hotspot (and is a member of that private hotspot), the user's media device 10 sends a push notification 90 to the user. When the user activates the notification 90 affirmatively that the user wishes to receive information, the user's media device 10 sends a request to the server 14 for the information. In response, the server 14 retrieves the information to be broadcast from the database 74 on the server 14 or in a folder of uploaded files 76 on the server 14, and transmits that information over the cellular network or Wi-Fi network to the mobile application 32 on the user's media device 10.

Figure 3:
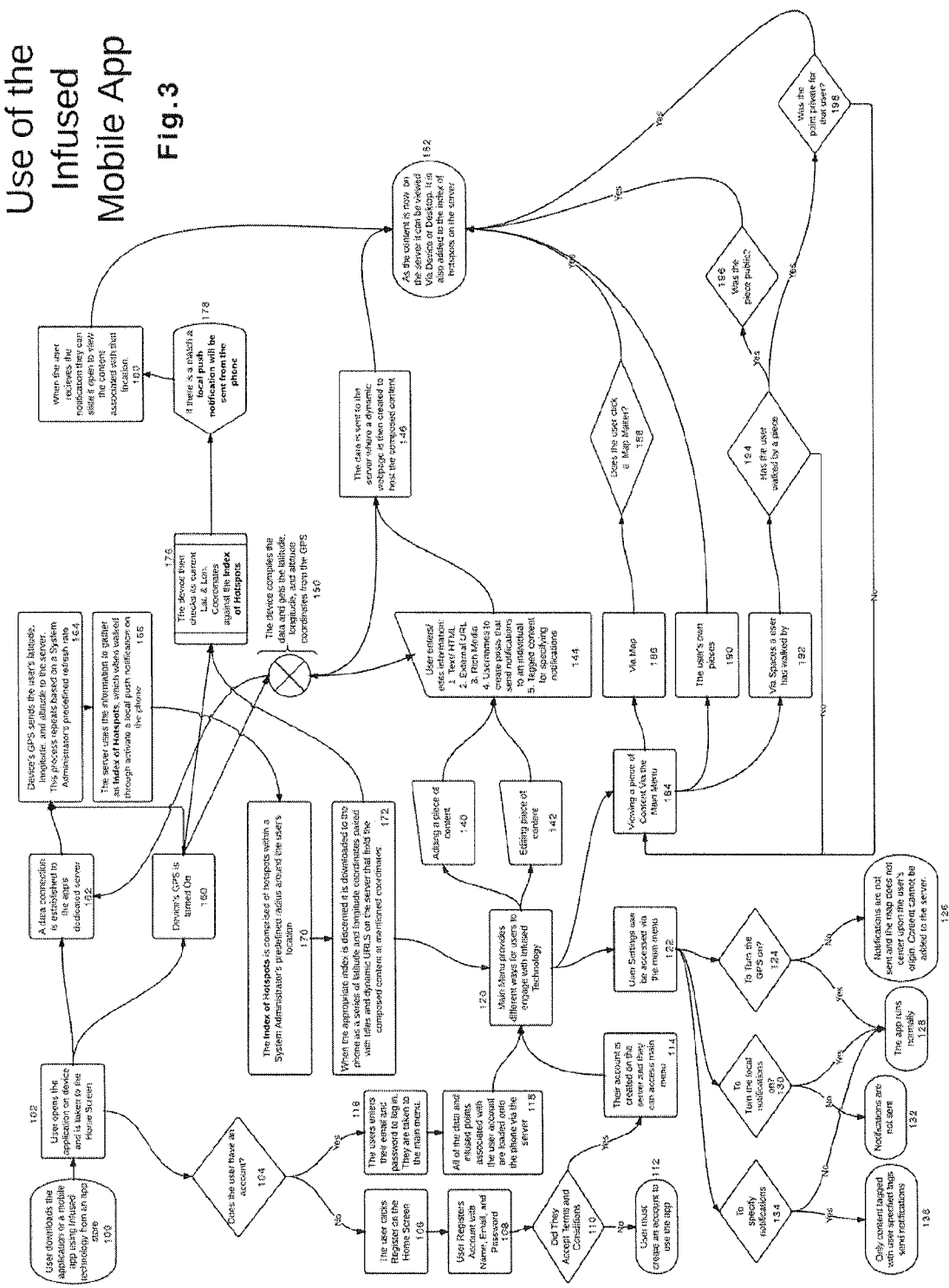
FIG. 3 is a detailed flowchart showing the operation and functionality of an embodiment from the perspective of the user's media device.

FIG. 3 is a detailed flowchart showing the operation and functionality of an embodiment from the perspective of the user's media device 10. The user's media device may be a mobile device, such as a cell phone, mobile phone, tablet, phablet, mini-tablet, laptop computer, wearable media devices (watches, eyeglasses), a GPS system in a car or vehicle, and the like, or it may be a non-mobile media device such as a desktop computer or server. In step 100 in FIG. 3, the user downloads a desktop application or mobile application from the internet, where the application has hardware and software needed to run the processes for delivering content information to a user on a hyper-local basis. In step 102, the user opens and runs the application. Step 104 queries whether the user has an account. If the user does not have an account, the application asks the user to click on the "register" link to create an account. In step 108, the user creates an account with the user's name, email address, and password. Step 110 queries whether the user has accepted the terms and conditions of the application. If the user has not, step 112 requires the user to accept the terms and conditions in order to create an account. If the user has accepted the terms and conditions, the application causes the server to create an account, and the user can now access the main menu of the application in step 114. If the user already had an account, step 116 permits the user to enter the user's name and password to log into the account, where the application displays the main menu. When the user logs in to the user's account, in step 118, all of the data, account information, and hotspots associated with the user's account are loaded by the server 14 onto the user's media device 10.

In step 120, the main menu of the application provides different ways for the user to use the application. For example, the user may, in step 122, change the user settings. The user may turn the GPS on or off, in step 124. To operate the novel technology, the GPS should be turned on. In step 126, if the GPS is turned off, notifications are not sent to the user, the map does not center on the user's location, and content information cannot be added to the server by the user. In step 128, if the GPS is turned on, the application runs normally, where notifications are sent to the user, the map can center on the user's location, and content information can be added to the server by the user. In step 130, the user can turn the notifications on or off. If notifications are turned off, no notifications are sent to the user, as shown in step 132. If notifications are enabled, the application runs normally, as shown in step 128.

In step 134, the user may specify details with regard to notifications. To set notification details in step 136, the user may, for example, specify that notifications can be sent to the user for only that content tagged with user specified tags. This permits the user to decide what types of content it wishes to receive. For example, a male user might not want ads about women's deodorant, while a golfer user may be interested in coupons for golf equipment, golf lessons, or golf courses.

Going back to the main menu in step 120, the application allows a user to create a hotspot and infuse the hotspot with content information that is delivered to other users who enter the hotspot. A user may create a hotspot in the same way as previously described for a server owner to create a hotspot.

Besides creating public hotspots that push information to anyone who enters the hotspot, a user may create a private-space hotspot. A private-space hotspot only pushes information to specific people who enter the hotspot. The private-space hotspot enables the user to be selective as to the audience. For example, a private-space hotspot could be for family members to share family photos. Or a private-space hotspot could be for consumer members to receive special coupons. Where a store has different levels of membership, a private-space hotspot may distinguish between membership levels and push information to those belonging to a certain membership level.

To infuse content information to a hotspot, the user may decide to add content information to a hotspot in step 140. To do so, the user enters step 144 and inputs the content information in the form of text, HTML programming, rich media (music, video, photos, etc.), which is then uploaded to the server 14. The user may create a private hotspot for a specific individual or group of individuals so the user's content information may be broadcast to only the user-selected individual(s) and not to the public. To designate an individual as having rights to a private hotspot, the user inputs to and associates with the private hotspot the username or other identification of the designated individual. Then when the media device(s) 10 of the designated individual(s) passes through the private hotspot and their username or identity matches the list of designated individuals for that hotspot, their media device(s) 10 will send push notifications to the designated individual(s). In other words, the private hotspot acts like a hyper-local install message for your designated friend(s) and that is not shared to the public. Private hotspots are further described below in the section titled "Collected Spaces and Private Spaces." The user may also tag content information with specific tags so the notification process can determine whether the content information is relevant to the particular user (as set by the user in step 136). Step 142 permits a user to edit content that was previously uploaded to the server 14.

To do so, the user may add content information to a hotspot in step 140. To add content or edit content information, the user must click the content information at issue in the main menu. Then, they may enter text, rich media, HTML, usernames for private hotspots, tagged content, genre information, and external URLs. The user enters step 144 and inputs the content information in the form of text, HTML programming, rich media (music, video, photos, etc.). When the user is finished creating or editing the content information, the user clicks a "post" or similar button on the menu in order to "post" the content information. To "post" the content information, the user's media device compiles the content information into a format suitable for being understood by the engine script on the server 14. The user's media device 10 sends the compiled content information along with the user's GPS coordinates to the engine script that is running on the server 14, which then puts the content information in the appropriate place on the server 14. The engine script then dynamically creates a webpage with a unique URL for displaying the uploaded content information.

The user may input his or her username to create content information, where a push notification can be sent to an individual appearing on a private list of allowed recipients. When a user passes by a point in the index of hotspots, the user's media device 10 checks to see if the hotspot is a private hotspot. If the hotspot is a private hotspot, then only the users who are on the list of approved or allowed recipients can receive the push notification. The user may also tag content information with specific tags so the notification process can determine whether the content information is relevant to the particular user (as set by the user in step 136).

Besides uploading content information, the user may edit the user's previously uploaded content information (such as a new coupon or new ad promotion). Step 142 permits a user to edit content that was previously uploaded to the server 14. To do so, the user may decide to add content information to a hotspot in step 140. To do so, the user enters step 144 and inputs the content information in the form of text, HTML programming, rich media (music, video, photos, etc.), which is then uploaded to the server 14. The user's media device 10 in step 150 compiles the content data into a format that is suitable for transmission to the server 14. In step 146, the content information is sent by the user's media device to the server 14, where a dynamic webpage is created to host the composed content. As stated in step 182, now that the content resides on the server 14, the content can be sent to be displayed on the user's media device 10 or the user's desktop computer.

The next steps describe how the user's media device 10 causes content from hotspots in the vicinity to be sent to the user on a hyper-local basis. Step 160 assumes that the GPS in the user's media device is turned on, and if the GPS is turned off, the application may turn on the GPS. In step 162, the user's media device 10 establishes a data connection, by any means such as Wi-Fi or cellular networks, to the dedicated server 14 of the application. The user's media device 10 transmits its GPS coordinates, such as latitude, longitude, and altitude, to the server 14. The GPS coordinates are transmitted on a regular or intermittent basis, as defined by a predetermined refresh rate, which may be adjusted or changed by a system administrator or perhaps the user. The purpose of transmitting GPS coordinates periodically is to alert the server of the user's movements because as the user moves or drives, the hotspots that are proximate to the user may change. In step 166, the engine script (called "Twitch" in the figures) running on the server 14 processes the received GPS coordinates, finds hotspots within a certain predetermined proximity of the GPS coordinates, and creates an index of points (hotspots) within the predetermined proximity to the user's GPS location. The list of hotspots may be a list, an index, a table, or any other data structure that conveys relevant hotspots. As stated in step 170, the list of hotspots is comprised of hotspots within a predefined radius (as set by a system administrator or perhaps user) around the user's GPS location. The list preferably contains a series of latitude and longitude coordinates that are paired with titles and dynamic URLs of the server that stored the content information for each of the latitude and longitude coordinate. In other words, a hotspot is preferably identified by its GPS coordinates, title, and dynamic URL. In step 172, when the server 14 has finished creating the list of hotspots, the server 14 transmits the list to the user's media device 10, where the list is stored in memory or other storage device. Then the application returns to the main menu, in step 120.

The next steps describe the operation of the user's media device in receiving content relevant to a hotspot. Note that the hotspot may be created by the user or anyone else. Most often, a variety of people and companies will create hotspots and content for those hotspots. In use, the user's media device 10 uses its GPS to check its own GPS coordinates periodically. In step 176, when the GPS coordinates of the user's media device 10 matches (within a predetermined margin of error) the GPS coordinates of a hotspot or hotspots contained in the list of hotspots that was previously stored on the user's media device 10, the user's media device 10 sends a push notification to the user. The push notification may be any form of known push notifications, such as a banner, message, sound, alert, and so on. In step 180, when the user receives the push notification, which preferably informs the user about the nature of the content information, the user decides whether to accept the notification and receive the content information. For example, a push notification may be a banner that states that the user is near a golf equipment store and asks if the user would like to receive ads or a coupon to that store. As stated in step 182, as the content resides on the server 14, the content is sent to be displayed on the user's media device 10 or the user's desktop computer.

The following describes how a user may use the main menu to view the content of local hotspots. In step 184, after the user clicks the appropriate button on the main menu, the user's media device 10 can display the content information of a hotspot. The user has three options for finding hotspots to view: (1) by a Map of hotspots, where the user can explore what is in their immediate surroundings and beyond by clicking on map markers, (2) by Collected Spaces, which are spaces that users pass by when the application is on so that at a later point in time, users can click on of these spaces to see where they have been and to view content information for relevant hotspots, and (3) by Private Spaces, where the space was left by a specific user for the current user to find. Private spaces are posts that only send notifications when the appropriate user or user type pass by.

Map. Content information may be displayed via a map 186 of local hotspots, the user's own specified places 190, or places that the user has passed by 192. In step 188, if the user clicked on the "map maker" function on the main menu, the application generates a map of hotspots within a certain proximity to the GPS location of the user's media device 10. The map is displayed to the user on the user's media device 10 or user's desktop computer. Note that for purposes of this entire detailed description section of the embodiments, any information that is displayed on the user's media device 10 may be displayed on the user's desktop computer. A map of the hotspots in an area, city, country, or even world may be provided to users, as desired.

Collected Spaces and Private Spaces. In step 192, if the user selected to see hotspots that the user has passed by, the application determines whether the user has passed within a certain predetermined distance from the hotspot. If the user has passed by a hotspot, the application determines whether that hotspot is a public hotspot (step 196) or a private hotspot (step 198). If the hotspot is a public hotspot or a private hotspot where the user's identifying information appears on the list of members allowed to have access to content information from that private hotspot, the content information is sent by the server to the user's media device 10 and displayed to the user. If the user has no rights to see content information on the private hotspot or has not passed any local hotspots, the application returns to the main menu.

FIG. 4 is a detailed flowchart showing the operation and functionality of the Content Management System component 70 of FIG. 2. The Content Management System 70, which may be accessible from a website, enables its users to create, share, and edit content information. The Content Management System 70 will, with input from a user, create and store in the Content Management System 70 a user profile associated with each user. The user profile may include demographic information, platform-creation information, and information on content visited by the user. The Content Management System 70 may also, with input from a user, facilitate and store a record of private and public content created for others, as well as provide services (social sharing, in-app geolocated messaging, and ratings) to facilitate creation and interaction between or among users.

The Content Management System 70 may transmit, over one or more networks, content related to its services to a media device or other computing device of a user. A user may also install applications on a media or other computing device of the user for accessing a profile of the user and other data within the Content Management System 70. The Content Management System 70 will generate a hyper-localized set of content objects to display to a user, such as hotspots of media content, through which the user may walk and view works or information.

All of the content information is kept on a dedicated server 14. Users and systems administrators can access the content information and other data via the Content Management System 70. As shown in step 300, the Content Management System 70 manages a database of users, content information, hotspot locations, and media on the server 14. Filenames and media are kept in different places on the server 14. This Content Management System 70 may be accessed in two ways: (1) within the application running on the user's media device, and (2) on the home page of a website (as shown in step 302). Individuals must be registered as users to have access to the Content Management System 70. If a user attempting to log in is already a user, in step 304, the user can log in and be granted access to the Content Management System 70 in step 308. If the user is not already registered as a user in step 304, the Content Management System 70 will prompt the user to register an account in step 306, after which the user is granted access to the Content Management System 70. Once logged in, the Content Management System 70 determines whether the user has privileges of a system administrator, as shown in step 310.

If the user lacks privileges of a system administrator, the Content Management System 70 takes the user to a basic Content Management System 312. If the user is classified as a system administrator, the user will be granted access to an advanced Content Management System 314. The basic Content Management System 312 allows users to post and edit content information that the user had added, as well as their personal user experience which may include changing their username, password, email, and other registration information. The advanced Content Management System 314 for system administrators allows all of the functionality of the basic Content Management System 312, but includes additional functions as well. For example, the system administrator can modify his/her own personal experience, modify the experiences of all users, modify the application experience as discussed with respect to FIG. 5, as well as perform basic customer service, including deleting accounts, changing passwords, or emails.

The user may, for example, post content information in step 320, edit the user's previously stored content information in step 324, or modify their personal user experience in step 330. Users can create, edit, rate, and share their work. Users can interact via their chosen portals via private hotspots or messages. Depending on which action a user takes in the Content Management System 70, an appropriate web form will be populated with the relevant data called from the server 14, as shown in steps 322 and 326. If the user makes changes to this web form in step 328, the information is sent back to the server 14 where it is processed by the engine script running on the server 14 and is then recorded and stored in the database on the server 14. This process repeats itself as often as the user wishes, where the data is updated in real time, which means that the updated data affects both application and web users simultaneously.

The system administrator can perform the same functions described above for a regular user. In addition, the system administrator may modify the application experience in step 340, modify the experience of all users in step 344, or perform customer service functions in step 342. As with the regular user, depending on which action a system administrator takes in the Content Management System 70, an appropriate web form will be populated with the relevant data called from the server 14, as shown in steps 322 and 326. If the user makes changes to this web form in step 328, the information is sent back to the server 14 where it is processed by the engine script running on the server 14 and is then recorded and stored in the database on the server 14. This process repeats itself as often as the system administrator wishes, where the data is updated in real time, which means that the updated data affects both application and web users simultaneously.

The server owner of the server 14 may create a hotspot by following these steps, where the reference numerals refer to those in the patent figures: (1) a user navigates to the homepage of the website that the user intends to use to geocode a hotspot; (2) the user logs on via that homepage and enters the Content Management System (70)(304)(308); (3) if the user is a system administrator, the user is given more options regarding changing the application's performance, customer service, and remote settings (310)(314)(330)(320)(324)(340)(342)(344); (4) once granted access to the Content Management System 70, the user can infuse a hotspot (also referred to as geocoding a hotspot), edit infused hotspots, delete hotspots, move the geolocation of an infused hotspot, change the user's profile picture, change the user's account settings, and delete the user's account (312)(330)(320)(324)(326); (5) if the user chooses to infuse (geocode) content information, the user first clicks the "Add Content" button (330)(320)(324)(322) in the Content Management System 70; (6) once the "Add Content" button is pressed, a web form opens that preferably asks for the following information: title, address, tags, sent to a specified user(s), external link, uploaded file, and text description or story (322); (7) the user enters the relevant information into the web form (322); (8) as the user enters the address into the form, it auto-populates via a common Java and PHP script (328); (9) when the user submits the data filled out in the web form, the data runs through the engine script program running on the server 14, which is a series of PHP functions written in a script that acts as crossing guard that directs data to its appropriate destination (328) to (300); (10) the address is passed through a third-party application programming interface ("API") produced by a mapping service such as Google Maps, which then attributes to the address an exact latitude and longitude provided by GPS data; (11) that data is returned to the engine script, which then saves the data in the correct destination in the database tied to the user's posted content information.

FIG. 5 is a detailed diagram of the processes running on the server 14 of FIG. 1. Step 400 shows that all of the data is stored on the server 14, which may be a dedicated server or a server in a cloud. Data is stored in various appropriate locations of the server 14, which may, for example, be divided by function. In step 402, the server 14 has a URL for its webpage and an associated IP address. As shown at 404, the server 14 handles ratings 406, analytics 414, the database 452 in which content information and other data are stored, remote application settings 430, and user and address database 450, which includes the index of hotspots.

The ratings database 406 stores the usernames 408 who accessed the hotspot, average rating 410 as calculated for the hotspot, and the date that a hotspot was last rated 412. The ratings database enables the server administrator to study use and effectiveness of each hotspot.

The analytics database and processor 414 keeps track of the number of times a hotspot has been passed by someone (416) and how many times a push notification has been opened by a user (418). The analytics database enables the server administrator to study use and effectiveness of each hotspot.

The remote application settings 430 are stored on the server 14. The settings include, for example, the map offset 432, margin of error 434, radius of the broadcast 436, refresh rate for sending GPS coordinates 440, and the refresh rate timeout 442. All of these settings may be changed or edited by a system administrator via the Content Management System 70 previously discussed.

Changing any of these settings affects how the application runs. The map offset 432 is the degree by which points with the same name and location are separated and differentiated so that hotspots do not overwrite one another. Changing the margin of error 434 affects where a piece of content information is stored because GPS systems are currently accurate up to only a certain point. The margin-of-error setting increases the chance that a user will post a piece of content information in the right location, and that a user's media device 10 passing through a hotspot will recognize that it is doing so and push a local notification to the user. The radius of broadcast 436 sets how close to the center coordinate of a hotspot a user must be for the user's media device 10 to confirm a hit with the hotspot and send a local push notification to the user. In other words, the radius of broadcast defines an area around a particular GPS location where if a user's media device 10 enters into the area, the device 10 may push a notification to the user. The refresh rate for GPS data 440 and the refresh rate timeout 442 deal with how often a user's media device 10 should send its GPS coordinates to the server 14 before timing out. For example, the refresh rate may be every 0.25 mile and the time out may be 5 seconds. If no signal is received from the GPS satellites after a certain amount of clicks (attempts), it will stop trying to connect to the GPS satellites.

The user and address database 450 is the main repository for user data, content, geolocation information, as well as user platform information for troubleshooting. This is preferably a basic table. The user-inputted address auto-populates based on the latitude, longitude, and altitude information collected by the user's media device 10. The inverse is true when a user is using the Content Management System 70 on the web.

The user and address database 450, as well as the updated media database 452, may store an uploaded filename of the content information 460, the content information itself 462, the GPS coordinates (latitude, longitude, and altitude) 464, the username 466, the kind of map marker 468 (there are different kinds of markers for content information or users), the title of the content information 470, data about the creation (where, when, and how) of the content information 472, address of the user 474, when the content information was last rated or moved 476, the URL to access the content information 478, and tags 480 created by the originator of the content information to identify key word descriptors about the content, such as the genre 482. Note that, preferably, only the filename of an uploaded content information is stored in the table of the user and address database 450. The content information itself is saved in an upload folder 462. The above list of data is just an exemplary list of data that may reside in these databases. Other data may be added as desired. The Content Management System 70 allows all of this information to be created and edited in real time. As shown in 490, the data may be pushed to the mobile application running on the user's media device 10 via a cellular or Wi-Fi data connection for hotspot notification, personal user content, private hotspot content, etc., as described in this specification. Using a well-known PHP script language, the content of the webpage may be dynamically composed and given a URL 478, as shown in 494. All of the above data is compiled by the Twitch engine script into a dynamic webpage with its own URL for display. This URL is what the user calls when they open a notification, click a map marker, open one of their collected or private pieces of content information. Finally, the data may be viewed by the user on the mobile application running on the user's media device 10 or the user's desktop computer, as shown in 498.

In the foregoing specification, the invention has been described with reference to specific embodiments thereof. It will, however, be evident that various modifications and changes may be made thereto without departing from the broader spirit and scope of the invention. For example, the reader is to understand that the specific ordering and combination of process actions shown in the process flow diagrams described herein is merely illustrative, and the invention can be performed using different or additional process actions, or a different combination or ordering of process actions. As another example, each feature of one embodiment can be mixed and matched with other features shown in other embodiments. Features and processes known to those of ordinary skill in the art of identification appliances may similarly be incorporated as desired. Additionally and obviously, features may be added or subtracted as desired. Accordingly, the invention is not to be restricted.

What is claimed is:

1. A method for accessing content related to geolocated hotspots based on a user's location, comprising:
    receiving, in response to a request from a user device, a list of one or more geolocated hotspots that are located within a same zone as a first location of the user, wherein the list of one or more geolocated hotspots is received as only a single transaction between the user device and a server;
    determining whether one or more of the geolocated hotspots in the list of one or more geolocated hotspots are near a second location of the user, wherein the second location of the user is the user's current location; and
    triggering the user device to notify the user after determining the second location is near one or more geolocated hotspots from the list of one or more geolocated hotspots,
    wherein the determining whether one or more of the geolocated hotspots in the list of one or more geolocated hotspots are near a second location of the user is performed locally in the user device.

2. The method of claim 1, further comprising: providing, in response to input from the user, content related to one or more geolocated hotspots that are near the second location of the user.

3. The method of claim 1, wherein the request from the user device occurs based on movement of the user.

4. The method of claim 1, wherein the request from the user device occurs based on an interval of time since a previous request from the user device.

5. The method of claim 1, wherein the request from the user device and the list of one or more geolocated hotspots are transported over a cellular network.

6. The method of claim 1, wherein the request from the user device and the list of one or more geolocated hotspots are transported over a wireless network.

7. The method of claim 1, wherein one or more geolocated hotspots comprise a commercial establishment.

8. A system for providing content related to geolocated hotspots to a user based on the user's location, comprising:
    a user device configured to, in response to a first triggering event, transmit a first location of the user to a server and, upon receipt of a list of one or more geolocated hotspots, the user device is further configured to, in response to a second triggering event, notify the user of one or more geolocated hotspots that are near a second location of the user, wherein the second location of the user is the user's current location, and wherein the notification provides the option to view content relating to the one or more geolocated hotspots that are near the second location of the user;
    a server configured to receive the first location of the user from the user device and to transmit to the user device the list of geolocated hotspots that are within a same zone as the first location of the user, wherein the receipt of the first location of the user and the transmission of the list of geolocated hotspots occur in only a single transaction between the user device and the server; and
    a network configured to transport information between the user device and the server, wherein the information represents the first location of the user and the list of one or more geolocated hotspots,
    wherein the user device is configured to determine locally in the user device whether one or more of the geolocated hotspots in the list of geolocated hotspots is near the second location of the user.

9. The system of claim 8, wherein the second triggering event occurs based on movement of the user.

10. The system of claim 8, wherein the second triggering event occurs based on an amount of time since a previous triggering event.

11. The system of claim 8, wherein the first location of the user and the list of geolocated hotspots are transported over a cellular network.

12. The system of claim 8, wherein the first location of the user and the list of geolocated hotspots are transported over a wireless network.

13. The system of claim 8, wherein the user device comprises a smartphone.

14. The system of claim 8, wherein the user device comprises a wearable device.

15. The system of claim 8, wherein one or more geolocated hotspots comprise a commercial establishment.

16. A user device for providing content to a user based on the user's location, comprising:
    hardware is configured to determine a first location of the user;
    a transmitter configured to transmit the first location of the user to a server, wherein the first location of the user is transmitted when a first triggering event occurs;
    a receiver configured to receive a response from the server, wherein the response from the server comprises a list of one or more geolocated hotspots that are within a same zone as the first location of the user;
    a comparator configured to compare a second location of the user to one or more locations on the list of geolocated hotspots, wherein the second location of the user is the user's current location; and
    a notification generator configured to generate a user notification based on the second location of the user when a second triggering event occurs, wherein the user notification provides the option to see content associated with a geolocated hotspot near the second location of the user;
    wherein the transmitter transmits the first location of the user to the server and the receiver receives the response from the server in only a single transaction between the user device and the server, and
    wherein the user device is configured to determine locally in the user device whether one or more of the geolocated hotspots in the list of geolocated hotspots is near the second location of the user.

17. The user device of claim 16, further comprising hardware configured to display content associated with a geolocated hotspot in response to input from the user.

18. The user device of claim 16, wherein the second triggering event occurs based on movement of the user.

19. The user device of claim 16, wherein the second triggering event occurs based on an amount of time since a previous triggering event.

20. The user device of claim 16, wherein the first location of the user and the list of geolocated hotspots are transported over a cellular network.

21. The user device of claim 16, wherein the first location of the user and the list of geolocated hotspots are transported over a wireless network.

22. The user device of claim 16, wherein the user device comprises a smartphone.

23. The user device of claim 16, wherein the user device comprises a wearable device.

24. The user device of claim 16, wherein one or more geolocated hotspots comprise a commercial establishment.

25. The user device of claim 16, wherein the content associated with one or more geolocated hotspots comprises a link to a website.

26. The user device of claim 16, wherein the content associated with one or more geolocated hotspots comprises retail information.

27. The user device of claim 16, wherein the content associated with one or more geolocated hotspots comprises a link to an e-commerce system.

28. The user device of claim 16, wherein the content associated with one or more geolocated hotspots comprises a link to social media.

29. The user device of claim 16, wherein the content associated with one or more geolocated hotspots comprises a media file.

30. A server for providing content to a requesting user based on a location of the requesting user, comprising:
    memory configured to store a list of available hotspots, wherein the available hotspots are provided by one or more users;
    memory configured to store content associated with the available hotspots, wherein the content associated with the available hotspots is provided by one or more users;
    a receiver configured to receive the location of the requesting user, wherein the location of the requesting user is received after a first triggering event occurs in a user device of the requesting user;
    a geolocated-hotspot generator configured to compare the location of the requesting user to the stored list of available hotspots and further configured to generate a list of one or more geolocated hotspots that are within a same zone as the location of the requesting user; and
    a transmitter configured to transmit the list of geolocated hotspots to the requesting user after a second triggering event occurs in the user device of the requesting user, wherein the list of geolocated hotspots includes content associated with the geolocated hotspots, and wherein the user device of the requesting user is configured to locally determine which of the geolocated hotspots in the list of geolocated hotspots is near the requesting user's current location,
    wherein the receiver receives the location of the requesting user to the server and the transmitter transmits the list of geolocated hotspots to the requesting user from the server in only a single transaction between the user device and the server.

31. The server of claim 30, further comprising a systems-settings manager configured to manage system settings relating to the available hotspots, wherein the system settings include one or more of zone boundaries, distance from the location of the requesting user, margin of error for the location of the requesting user, and request time-out rate.

32. The server of claim 30, wherein the list of available hotspots are editable by one or more users.

33. The server of claim 30, wherein the content associated with one or more available hotspots are editable by one or more users.

34. The server of claim 30, wherein the location of the requesting user and the list of geolocated hotspots are transported over a cellular network.

35. The server of claim 30, wherein the location of the requesting user and the list of geolocated hotspots are transported over a wireless network.

36. The server of claim 30, wherein one or more available hotspots comprise a commercial establishment.

37. The server of claim 30, wherein the content associated with one or more available hotspots comprises a link to a website.

38. The server of claim 30, wherein the content associated with one or more available hotspots comprises retail information.

39. The server of claim 30, wherein the content associated with one or more available hotspots comprises a link to an e-commerce system.

40. The server of claim 30, wherein the content associated with one or more available hotspots comprises a link to social media.

41. The server of claim 30, wherein the content associated with one or more available hotspots comprises a media file.

* * * * *